(12) United States Patent
Siemes

(10) Patent No.: US 10,545,220 B2
(45) Date of Patent: Jan. 28, 2020

(54) EMBEDDED COMMUNICATION AUTHENTICATION

(71) Applicant: NXP B.V.

(72) Inventor: Jörg Andreas Siemes, Dresden (DE)

(73) Assignee: NXP B.V., Eindhoven (NL)

( * ) Notice: Subject to any disclaimer, the term of this patent is extended or adjusted under 35 U.S.C. 154(b) by 317 days.

(21) Appl. No.: 15/336,680

(22) Filed: Oct. 27, 2016

(65) Prior Publication Data

US 2017/0123048 A1 May 4, 2017

(30) Foreign Application Priority Data

Nov. 4, 2015 (EP) ..................................... 15193066

(51) Int. Cl.
*G01S 7/00* (2006.01)
*H04B 1/3822* (2015.01)
*H04W 12/06* (2009.01)
*G01S 13/93* (2006.01)

(52) U.S. Cl.
CPC ............ *G01S 7/006* (2013.01); *G01S 13/931* (2013.01); *H04B 1/3822* (2013.01); *H04W 12/06* (2013.01); *G01S 2013/936* (2013.01)

(58) Field of Classification Search
CPC ............................... G01S 7/006; G01S 5/0072
USPC ................................................ 342/57, 70–72
See application file for complete search history.

(56) References Cited

U.S. PATENT DOCUMENTS

| | | | | |
|---|---|---|---|---|
| 4,694,297 A * | 9/1987 | Sewards | ................. | G01S 13/78 342/45 |
| 5,293,168 A | 3/1994 | Faulkner | | |
| 5,767,802 A | 6/1998 | Kosowsky et al. | | |
| 6,448,929 B1 | 9/2002 | Smith et al. | | |
| 6,614,387 B1 | 9/2003 | Deadman | | |
| 6,615,137 B2 * | 9/2003 | Lutter | ................. | G08G 1/0965 340/436 |
| 6,661,378 B2 | 12/2003 | Bloy | | |
| 7,012,562 B2 | 3/2006 | Ikeda | | |
| 7,471,236 B1 * | 12/2008 | Pitt | ........................ | G01S 7/003 342/20 |
| 7,495,612 B2 | 2/2009 | Smith | | |
| 8,229,663 B2 * | 7/2012 | Zeng | .................... | B60W 40/02 180/168 |

(Continued)

FOREIGN PATENT DOCUMENTS

| | | |
|---|---|---|
| CN | 102215077 A | 10/2011 |
| DE | 28 08 544 A1 | 8/1979 |

(Continued)

OTHER PUBLICATIONS

Extended European Search Report for Patent Appln. No. 15193070.8 (dated May 23, 2016).

(Continued)

*Primary Examiner* — Marcus E Windrich

(74) *Attorney, Agent, or Firm* — Rajeev Madnawat

(57) ABSTRACT

A method and apparatus are provided to authenticate information embedded within radar signals. Radar signals comprising embedded information are received from a first sender. First position information is determined corresponding to a position of the first sender. Second position information associated with the embedded information is determined. The first and second position information is compared.

12 Claims, 9 Drawing Sheets

(56) References Cited

U.S. PATENT DOCUMENTS

| | | | |
|---|---|---|---|
| 9,084,190 B2* | 7/2015 | Noh | H04W 84/18 |
| 9,316,718 B2* | 4/2016 | Stahlin | H04L 67/12 |
| 9,465,104 B2 | 10/2016 | Margolin | |
| 9,598,009 B2* | 3/2017 | Christensen | G08G 1/163 |
| 2002/0003488 A1 | 1/2002 | Levin et al. | |
| 2003/0102997 A1* | 6/2003 | Levin | G01S 7/006 342/57 |
| 2007/0164896 A1 | 7/2007 | Suzuki et al. | |
| 2008/0036659 A1 | 2/2008 | Smith et al. | |
| 2010/0198513 A1* | 8/2010 | Zeng | B60W 40/02 701/300 |
| 2012/0001788 A1 | 1/2012 | Carlson et al. | |
| 2012/0001793 A1* | 1/2012 | Jacobs | G01S 7/4004 342/146 |
| 2013/0002477 A1* | 1/2013 | Dehnie | G01S 19/215 342/357.3 |
| 2013/0261948 A1 | 10/2013 | Funabashi | |
| 2014/0070980 A1 | 3/2014 | Park | |
| 2017/0153314 A1 | 6/2017 | Siemes | |

FOREIGN PATENT DOCUMENTS

| | | |
|---|---|---|
| DE | 10 2009 054 776 A1 | 8/2010 |
| WO | 0041153 A1 | 7/2000 |

OTHER PUBLICATIONS

Extended European Search Report for Patent Appln. No. 15193066.6 (dated May 23, 2016).

Leen, Y. et al "The OFDM Joint Radar-Communication System: An Overview", 69-74 pgs., retrieved from the Internet at: http://www.thinkmind.org/download.php?articleid=spacomm_2011_4_20_3007 (Apr. 20, 2011).

Non-Final Rejection for U.S. Appl. No. 15/336,706, 13 pgs. (dated Aug. 6, 2019).

* cited by examiner

EMBEDDED COMMUNICATION AUTHENTICATION

CROSS-REFERENCE TO RELATED APPLICATIONS

This application claims the priority under 35 U.S.C. § 119 of European Patent application no. 15193066.6, filed on Nov. 4, 2015, the contents of which are incorporated by reference herein.

FIELD

The present application relates to using radar communication to verify a sender and in particular, but not exclusively, to verifying a sender in vehicle to vehicle (V2V) communication.

BACKGROUND

Intelligent transportation systems have been proposed which aim to provide innovative services relating to different modes of transport and traffic management which will enable various users to be better informed and make safer, more coordinated, and 'smarter' use of transport networks. In particular, intelligent transport solutions have been proposed for use in road transportation in which information and communication technologies may be applied to, for example, infrastructure, vehicles and users as well as in traffic mobility management.

Part of such solutions involve the ability of a vehicle to communicate. For example, communication by a vehicle with other vehicles, infrastructure such as traffic lights, toll gates or parking meters and/or other entities may be beneficial to implementation of intelligent transport solution. A vehicle's awareness of the surrounding environment may also be of use in intelligent transport solutions.

In response to such communications, a vehicle may change its behaviour. For example, if the communication indicates that there is heavy traffic ahead, a vehicle may suggest that another route be taken. In the case that an obstacle is detected ahead, the vehicle may brake or implement other collision avoidance. Thus the detection of the validity of information in such communications is of interest.

SUMMARY OF INVENTION

According to a first aspect, there is provided a method comprising authenticating information embedded within radar signals by: receiving radar signals comprising embedded information from a first sender; determining first position information corresponding to a position of the first sender; determining second position information associated with the embedded information; and comparing the first and second position information.

The method may further comprise determining the first position information in dependence on reception characteristics of the radar signals. Determining the first position information may comprise processing at least one of the radar signals using a radar algorithm. Determining the second position information may comprise demodulating at least one of the radar signals to recover the embedded information. The embedded information may comprise an indication of a position associated with the embedded information. The method may further comprise determining the authentication of the first sender in dependence on the comparison.

The method may further comprise: receiving the radar signals from the first sender in a first period, each of the radar signals comprising embedded information; and for each of the radar signals: determining a respective one of the first position information corresponding to a position of the first sender; determining a respective one of the second position information associated with embedded information in the radar signal; and comparing the respective ones of the first and second position information.

The method may further comprise determining the authentication of the first sender at the end of the period in dependence on the comparisons. The first position information may correspond to positions of the first sender and the second position information may correspond to positions associated with the embedded information. The method may further comprise, for each comparison: increasing a probability that the first sender is authentic if the respective ones of the first and second position corresponds and decreasing the probability if the respective ones of the first and second position do not correspond. Determining the authentication of the first sender in dependence on the comparison may comprise determining the authentication of the first sender in dependence on the probability. The method may further comprise: comparing the embedded information to corresponding information from other sources; and determining the authentication of the first sender in further dependence on the comparison between the embedded information and the corresponding information.

The first position information may comprise a motion of the radar sender and the second position information may comprise a motion associated with the embedded information. The step of determining the position information of the radar signal may comprise determining from the radar signals at least two positions of the radar sender and determining a difference between the at least two positions. The method may further comprise determining a motion of the first sender in dependence on the difference. The method may further comprise determining that the motion of the first sender is feasible. The step of determining the position information associated with the embedded information may comprise determining at least two positions associated with the embedded information and determining a difference between the at least two positions.

The method may further comprise determining a motion associated with the embedded information in dependence on the difference. The method may further comprise determining that the motion associated with the embedded information is feasible. The step of comparing the first and second position information may further comprise comparing the motion of the first sender and the motion associated with the embedded information.

According to a second aspect, there is provided an apparatus comprising: an input configured to receive radar signals comprising embedded information; a first path configured to recover the embedded information in the radar signals; a second path configured to map a position of a sender of the radar signals based on a radar algorithm; and an authentication block configured to: determine first position information corresponding to a position of a sender of the radar signal and second position information associated with the embedded information; and compare the first and second position information.

The apparatus may be a joint radar and communication system. The authentication block may be further configured to determine the authentication of the first sender at the end of the period in dependence on the comparisons. The first position information may correspond to positions of the first sender and the second position information corresponds to positions associated with the embedded information. The authentication block may be further configured to, for each comparison: increasing a probability that the first sender is authentic if the respective ones of the first and second position corresponds and decreasing the probability if the respective ones of the first and second position do not correspond. Determining the authentication of the first sender in dependence on the comparison may comprise determining the authentication of the first sender in dependence on the probability.

The authentication block may be further configured to: compare the embedded information to corresponding information from other sources; and determine the authentication of the first sender in further dependence on the comparison between the embedded information and the corresponding information. The first position information may comprise a motion of the radar sender and the second position information may comprise a motion associated with the embedded information. Determining the position information of the radar signal may comprise determining from the radar signals at least two positions of the radar sender and determining a difference between the at least two positions.

The authentication block may be further configured to determine a motion of the first sender in dependence on the difference. The authentication block may be further configured to determine that the motion of the first sender is feasible. Determining the position information associated with the embedded information may comprise determining at least two positions associated with the embedded information and determining a difference between the at least two positions. The authentication block may be further configured to determine a motion associated with the embedded information in dependence on the difference. The authentication block may be further configured to determine that the motion associated with the embedded information is feasible. The step of comparing the first and second position information may further comprise comparing the motion of the first sender and the motion associated with the embedded information.

According to a third aspect, there is provided a method comprising: receiving a radar signal comprising first identity information; receiving information on a non-radar channel comprising second identity information; and determining that the radar signal and the information on the non-radar channel are sent from a first sender when the first and second identity information corresponds.

The method may further comprise: determining a first position associated with the radar signal; and associating the first position with the information on the non-radar signal when the first and second identity information corresponds. The method may further comprise: determining a second position associated with the information on the non-radar channel; and determining that the first position and the second position correspond. The non-radar channel may be a V2X channel. The method may further comprise determining the first position in dependence on reception characteristics of the radar signal. Determining the first position may comprise processing the radar signal using a radar algorithm. The information on the non-radar channel may comprise an indication of a position associated with the information.

The method may further comprise authenticating the information when the first and second positions correspond.

The method may further comprise: increasing a probability that the first sender can be trusted when the positions correspond; and decreasing a probability that the first sender can be trusted when the positions do not correspond. The method may further comprise: authenticating the first sender when the probability reaches a threshold; and trusting all further information sent on a non-radar channel comprising the second identity.

The information on the non-radar channel may be received before the radar signal. The first identity information may comprise a public key of the first sender and the second identity information comprises data signed by a private key of the first sender. The first identity information may comprise a symmetrical key of the first sender and the second identity information may comprise at least some of the information encrypted by the symmetrical key. At least parts of the first identity information and the second identity information may be encrypted with a first symmetrical key. The second identity information may be the information on the non-radar channel and the first identity information may be a hash of the information on the non-radar channel. The first identity information and the second identity information may comprise a token. The token may comprise a random number.

According to a fourth aspect, there is provided a receiver comprising: a first input configured to receive a radar signal comprising first identity information; a second input configured to receive information on a non-radar channel comprising second identity information; and an authentication block configured to determine that the radar signal and the information on the non-radar channel are sent from a first sender when the first and second identity information corresponds.

The apparatus may further comprise: a first path configured to process the information on the second input; a second path configured to map a position of a sender of the radar signals based on a radar algorithm; and the authentication block further configured to: determine a first position of the first sender from a received radar signal using the second path; and associate the first position with the information on the non-radar signal when the first and second identity information corresponds.

According to a fifth aspect, there is provided a sender comprising: a first transmitter configured to transmit a radar signal comprising first identity information; and a second transmitter configured to transmit information on a non-radar channel comprising second identity information corresponding to the first identity information.

BRIEF DESCRIPTION OF DRAWINGS

Embodiments will be described, by way of example only, with reference to the drawings, in which.

DESCRIPTION

Figure 1A:
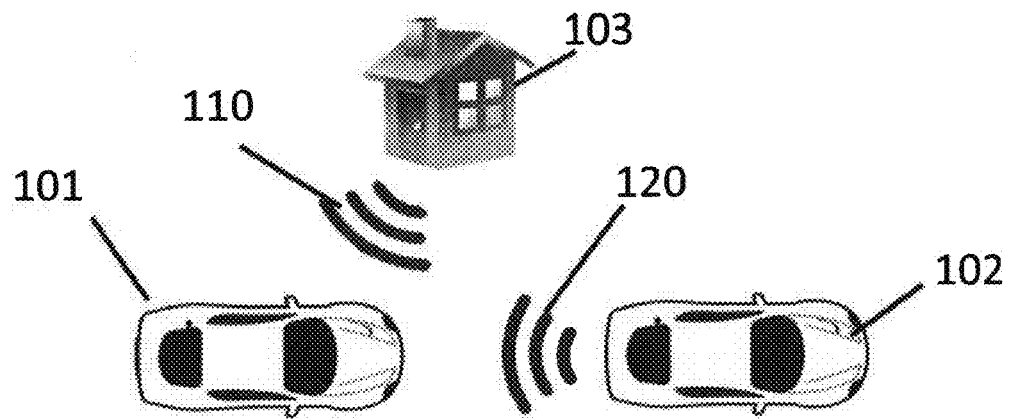
FIGS. 1a, 1b and 1c shows examples of communication between a vehicle and further entities.

Some vehicles may incorporate one or more sensors, systems and/or communication inputs to address concerns such as vehicle safety. For example such sensors and communication inputs may be used to evaluate the vehicle environment, the vehicle's own position within this environment, and upcoming dangers within the environment.

For example, a vehicle may be equipped with a radar system which can map the environment surrounding the vehicle. These radar systems may be useful for collision prevention.

Radar systems may operate by emitting a radar signal comprising a burst of high frequency radio waves. The high frequency radio waves are reflected off objects in the environment surrounding the radar system and are received as a signal by a detector of the radar system. The received signal may be used to map the environment surrounding the radar system. For example, the received signal may be used to determine a position, distance, speed and/or relative velocity of an object or other vehicle in the surrounding environment.

Some vehicles may additionally include one or more communication inputs that allow the vehicle to receive information from other entities.

An example of a communication input may be vehicle to vehicle communication (V2V), vehicle to infrastructure (V2I) and/or vehicle to everything (V2X) communication. V2I may include communication between vehicle and road side entities such as traffic lights, dynamic speed signs, toll gates or other payment collection as some examples. V2X communication may include communication between the vehicle and these and/or further entities.

Embodiments may relate to a system where the communication input and radar system has been combined. In particular the communications may be embedded in the radar system. An example of such a system is an orthogonal frequency division multiplexed (OFDM) radar signal in combination with (binary) phase shift keying ((B)PSK). In such systems an OFDM transmit signal may consist of parallel orthogonal sub carriers where each sub-carrier may modulated through PSK with data. It will however be appreciated that an OFDM with PSK signal is by way of example only and information may be embedded in a radar signal using other modulation schemes.

In these systems, the communications may be embedded within the radar signal and the radar signal may be used as a carrier to transmit the embedded communication from one vehicle to another. The receiving vehicle may decode the radar signal and provide the embedded communication to a further decoding system in order to decode the embedded information. Thus the radar system may both be capable of mapping a surrounding environment using radar signals and send and receive information or data embedded in the radar signal.

In some cases, this embedded information may be used for safety critical functions, for example automatic braking. It may become important to know whether the received information can be trusted. For example, the radar system may be capable of receiving a radar signal from any entity and may decode such a signal to provide the embedded information. In some cases, this information may be transmitted by a malicious or malfunctioning entity with the intent, for example, of causing a vehicle to behave in an undesired way.

Embodiments propose a system in which the authenticity of embedded information within a received radar signal may be determined. The authenticity may be determined based on a comparison between a determined position of a sender of the received radar signal and a position associated with the embedded information.

In some examples, the position of the sender of the received radar signal may be determined from reception properties of the received radar signal. The determined position may for example be a direction and/or distance from which the radar signal was received. The determined position may be compared to a position associated with the embedded information within the radar signal. The result of the comparison may be used to determine whether the embedded information is valid or authentic. For example, the comparison may determine whether the determined position of the sender of the radar signal corresponds with the position associated with the embedded information. In some examples, the radar signal may be monitored over a period and the result of each comparison may increase or decrease a value corresponding to the probability that the sender of the radar signal may be trusted.

Monitoring the radar signal over a period may take into account a margin of error in the determination of the positions of the sender of the radar signal and the positions associated with the embedded information.

In some examples, further checks may be made as to the authenticity or validity of the embedded information.

In a first example, a check may be carried out by comparing the embedded information to information from other sources, for example other senders from other vehicles or road side entities. In this case, it can be determined that the embedded information is valid or authentic if it corresponds to the information from other sources.

In a second example, the determined positions of the radar sender may be used to determine a motion or movement of the radar sender and/or the positions associated with the embedded information may be used to determine a motion or movement associated with the embedded information. A feasibility of one or more such motion or movement may additionally be determined.

In some examples, the embedded information may comprise traffic or vehicle related information. In other examples, the embedded information may be used to authenticate a sender of V2X information using a V2X channel. For example, the embedded information may comprise a key, hash or token that can be used to authenticate information transmitted on a V2X channel. The position of the sender of the key, hash or token can be verified and the key may be used in some examples to decode further communication on a V2X channel.

It will of course be appreciated that one or more examples can be combined.

FIG. 1a shows an example of a road-side situation in which invalid embedded information may be sent to a first vehicle 101. It will be appreciated that FIG. 1a is by way of example only and there are many scenarios in which invalid information may be sent to a vehicle. For example, a malicious or malfunctioning sender may be a road side entity, another vehicle in the vicinity of the receiving vehicle or other entity.

In the example of FIG. 1a, a road side entity 103 transmits a first radar signal 110 that is received by a first vehicle 101. The first radar signal 110 may comprise first embedded information, for example a V2V type communication. The first embedded information may include an indication of a position associated with the first embedded information.

In this scenario, the road side entity 103 may be a malicious entity attempting to trick the first vehicle 101 into thinking that the first embedded information is being sent from a second vehicle 102. Thus the indication of a position associated with the first embedded information included in the first embedded information will indicate a position of the second vehicle 102. In some examples, the indication may be explicit, for example may be an explicit position. In other examples, the indication may be implicit, for example the embedded information may relate to an accident or traffic conditions in the road which may only be known by a vehicle or entity in a nearby position.

In embodiments of the present disclosure, the first vehicle 101 may determine whether or not the first embedded information is valid and/or authentic. In some examples, the first vehicle 101 may authenticate the first embedded information by determining whether a position of a sender of the first radar signal 110 corresponds to a position associated with the first embedded information. The radar path of the first radar signal 110 may indicate a position of a sender of the first radar signal 110.

In some embodiments, the first vehicle 101 may determine a position of the sender of the first radar signal (in this case, the position of the road side entity 103) based on the reception characteristics or radar path of the first radar signal 110 and further determine a position associated with the first embedded information based on the indication of position in the first embedded information. If the determined position of the sender of the radar signal (i.e. the determined position of the road side entity 103) corresponds to the position associated with the first embedded information, then the first vehicle 101 may determine that the embedded information is valid and/or authentic.

In order to determine a position of the sender of a radar signal (in this example the road-side entity 103), a received radar signal 110 may be used to map the position of the sender. It will be appreciated that the radar signal 110 transmitted by the road side entity 103 is subject to reflections off objects in the vicinity of the sending road side entity 103. The radar signal 110 received at the first vehicle 101 may be received by one or more paths. This multipath reception characteristics or reception characteristics (e.g. directional characteristics) of the radar signal 110 may be used to map a position of the sender. This is shown in FIGS. 1b and 1c.

Figure 1B:
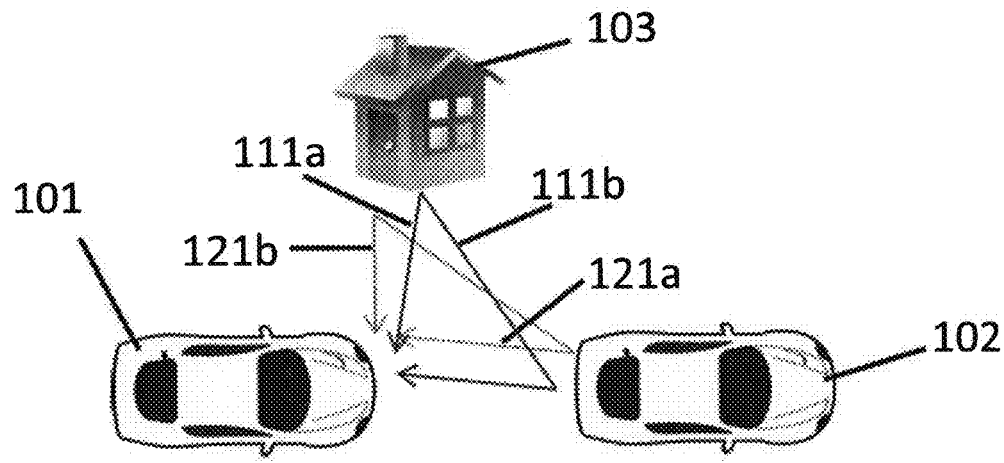
Figure 1C:
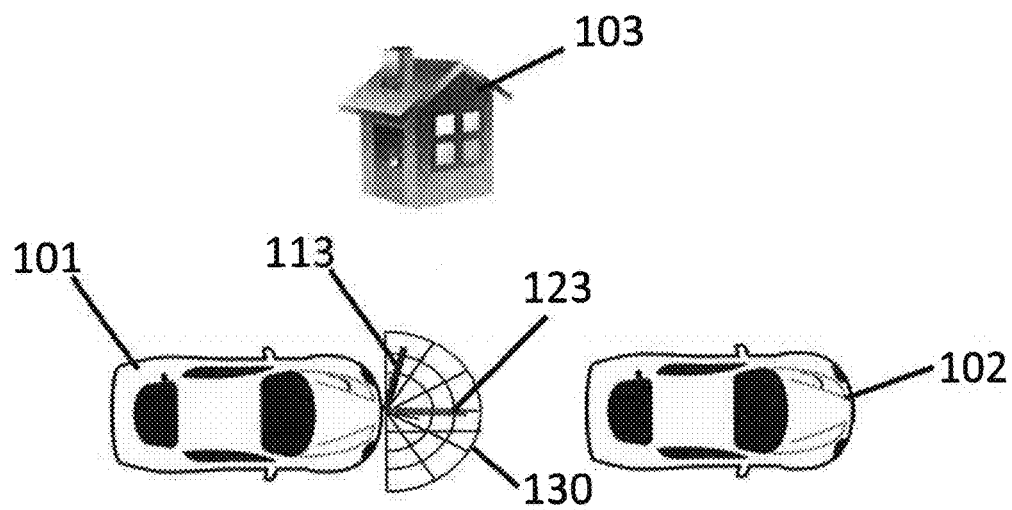

FIG. 1b shows a first path 111a and a second path 111b taken by the first radar signal 110 from the road-side entity 103 before being received by the first vehicle 101. FIG. 1b further shows a first and second path 121a and 121b that is taken by a second radar signal 120 from a second vehicle 102 before being received by the first vehicle 101. It will be appreciated that in this example, the road-side entity 103 is pretending to be in the position of the second vehicle 102 and as such the first embedded information in the first radar signal 110 indicates a position associated with the second vehicle 102 instead of the position from which it is sent.

The first radar signal 110 takes a first direct path 111a from the road-side entity 103 to the first vehicle 101. The first radar signal may also encounter the second vehicle 102 and be reflected off it along the second path 111b. The second radar signal 120 may take a direct path 121a from the second vehicle 102 to the first vehicle 101. The second radar signal 120 may encounter the road side entity 103 and be reflected off it to the first vehicle 101 along a second path 121b. It can be seen from FIG. 1b that the paths taken by the multipath radar signals 110, 120 to reach the first vehicle 101 are dependent on the positions of a sender 103, 102 of the radar signals 110, 120 and are different to each other.

In FIG. 1b two paths were described for each of the radar signals 110, 120 to reach the first vehicle 101. It will however be appreciated that a radar signal may be reflected along a plurality of paths. This may be dependent on the nature of the environment surrounding the sender of the radar signal and the number and nature of objects that the radar signal comes into contact with.

The first vehicle 101 may receive the first radar signal 110 comprising the first embedded information along the first and the second path 111a and 111b.

On receipt of the first radar signal 110, the first vehicle 101 may determine a position of a sender of the first radar signal 110 in dependence on the reception characteristics of the first radar signal 110. It will be appreciated that this sort of signal analysis may be carried out by radar systems even if no embedded information is present. In this example, the first vehicle 101 may use the multi-path reception of the radar signal 110 to determine a direction and/or distance of the first vehicle 101 from the sender 103.

FIG. 1c depicts the determination of the position of the sender of the received radar signal 110. FIG. 1c shows a diagram 130 showing the determined direction and the magnitude of the first radar signal 110 received by the first vehicle 101. The diagram shows a first vector 113 depicting the position of the sender of the first radar signal 110. The position of the sender of the first radar signal 110 comprises a direction and an estimated time of flight for the received first radar signal 110. It can be seen that the direction of the vector 113 corresponds to the direction of the road-side entity 103 from the first vehicle 101 and the magnitude of the vector 113 corresponds to a distance of the road-side entity 103 from the first vehicle 101. It will be appreciated that the time of flight of the first radar signal 110 may correspond to the distance covered by the first radar signal 110 before being received by the first vehicle 101.

The first vehicle 101 may also decode the first embedded information received in the first radar signal 110 to determine a position associated with the first embedded information. This position may be determined in dependence on an indication of the position associated with the first embedded information and included in the first embedded information. If the first embedded information is valid and/or authentic, the position associated with the first embedded information should correspond to the determined position of a sender of the first radar signal 110.

In this case, the position associated with the first embedded information is the position of the second vehicle 102 whereas the determined position of the sender of the first radar signal 110 is the position of the road side entity 103. It can be determined that these positions do not correspond and the first embedded information is not valid and/or authentic.

For the sake of completeness, FIG. 1b shows the paths 121a and 121b that a second radar signal transmitted from the second vehicle 102 may take. Similarly to the first radar signal 110, the first vehicle 101 may make a determination of the position of the sender of the second radar signal 120 which is shown as vector 123 in FIG. 1c. The direction of this vector 123 may correspond to the direction of the second vehicle 102 from the first vehicle 101 and the magnitude may correspond to the distance of the second vehicle 102 from the first vehicle 101 based on the estimated time of flight of the second radar signal 120.

The second radar signal 120 may comprise second embedded information including an indication of a position associated with the second embedded information. In this case, the first vehicle 101 may determine a position associated with the second embedded information based on the indication. For the second vehicle, the determined position of a sender of the second radar signal 120 will correspond with the position associated with the second embedded information. Thus it may be determined that the second embedded information is valid and/or authentic.

Figure 2:
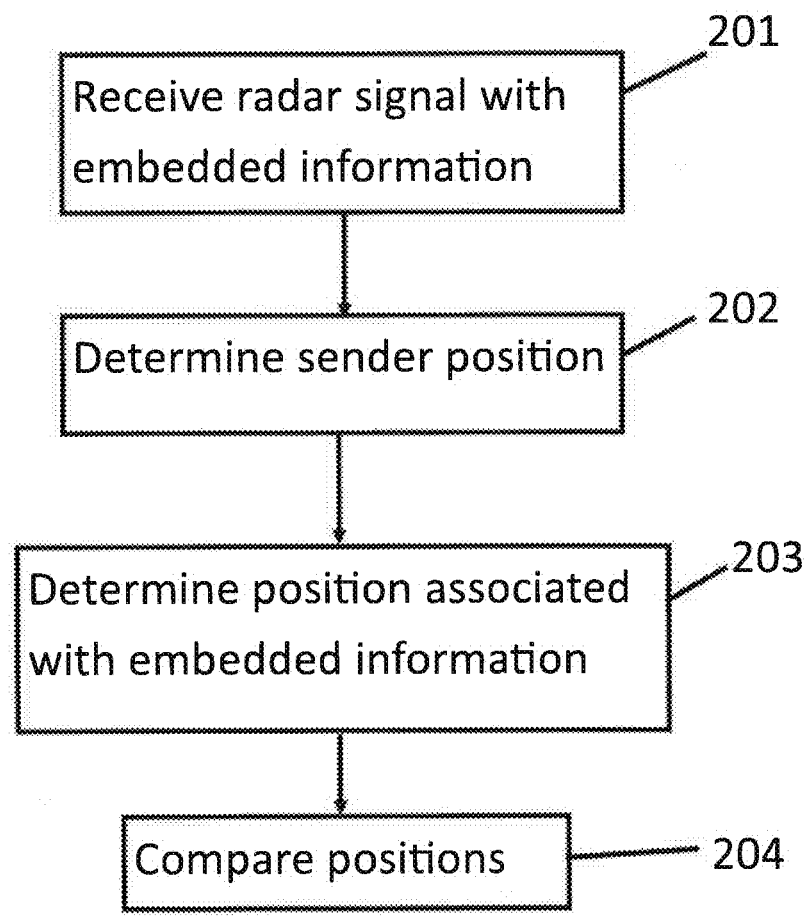
FIG. 2 is a flow diagram showing the method steps according to an embodiment.

FIG. 2 shows the method steps carried out by the first vehicle 101 or system associated with the first vehicle to provide a comparison of a position of a sender of a radar signal and a position associate with embedded information within the radar signal.

At step 201 in FIG. 2, a receiver may receive a radar signal comprising embedded information. In some examples, the receiver may be a combined radar and V2X communication receiver. The received radar signal may be received over one or more transmission paths from the sender of the radar signal to the receiver.

At step 202, a position of a sender of the radar signal may be determined. The position of the sender may be determined in dependence on reception characteristics of the radar signal. These reception characteristics may for example include a strength of the received radar signal, the number of paths over which the radar signal was received, a time of flight of the radar signal (including for example, the time of flight for each path of the radar signal), the distortion of the radar signal and/or other characteristics indicative of the signal flight time and path. For example, the delay between reception of the radar signal on different paths, the strength of the radar signals and/or time of flight of the radar signals on different paths may be used to determine a position of the sender.

It will be appreciated that in some embodiments, the position of the sender may not be absolutely determined and the position may be an indication of a direction of the sender from the receiver and a time of flight of a radar signal to reach the receiver from a sender of the radar signal. The time of flight may correspond with a distance from the receiver.

In some embodiments, the determination of a position of a sender of a radar signal may make use of environment mapping techniques. For example radar systems may employ complex environment mapping techniques which analyze the reflection of their own radar signals and radar signals from other radar systems in order to determine where objects in the surrounding environment are. Similar methods may be used to model a path of a received radar signal in order to determine a position of the sender of the received radar signal.

Environment mapping techniques may determine the position of objects by emitting radar signals and analyzing the reflections of the radar signals that are received by the radar system. Radar signals emitted from radar system of some objects in the surrounding environment may also be used to determine the position of objects in the environment.

In some examples, a first radar signal emitted from a radar system in a first direction and reflected back to a receiver in the radar system may be used to determine a distance to a first object 'A' based on the time of flight or delay of the signal. If the first radar signal is reflected back from another direction, it may indicate that another object 'B' is present in that direction. The distance of the object 'B' can be determined by the time of flight of the returned signal and the time of flight to the first object 'A'.

A second radar signal emitted from a neighbouring radar system (object 'C') may also be used to map the environment. A second radar signal emitted from third object 'C' and received at the receiver carrying out environment mapping may indicate the direction of object 'C' from the receiver. If an absolute time or transmit angle information is embedded within the second radar signal, the receiver can also determine an absolute distance or relative orientation of object 'C' with respect to the receiver. If a reflection of the second radar signal is received from another direction, the receiver can determine that another object 'D' is present in that direction. The distance of object 'D' from the receiver may be calculated based on the delay between the reception of the second radar signal and the reception of the reflection of the second radar signal and one or more of the positions of the transmitter and/or other objects in the environment.

At step 202 of the method of FIG. 2, the position of a sender of the received radar signal may be determined based for example on the mapped environment and the received radar signal reception characteristics. It will be appreciated that in some examples, the position of the sender of the radar signal may be determined based on the reception characteristics of the radar signal, however the use of the mapped environment information from the radar system may make determining the position more accurate.

The received radar signal may further be demodulated to provide the embedded information therein. The embedded information in the received radar signal may include an indication of a position associated with the embedded information. At step 203, the embedded information may be used to determine a position associated with the embedded information, for example based on the indication. In one example the embedded information may include an explicit indication of the position, for example a co-ordinate such as a GPS co-ordinate. In another example, the indication may be an implicit indication of the position, for example, the indication may include an absolute time stamp and/or angular information. The time stamp may be used to determine a flight time of the radar signal and the angular information such as a transmission angle may help map the reflections off known objects (for example known through the environment mapping) to determine a position associated with the embedded information.

It will be appreciated that the embedded information may comprise a variety of data. In some embodiments the embedded information may comprise the indication of a position associated with the embedded information plus other data. This other data may for example comprise V2X related information or other data. The indication of a position associated with the embedded data may for example comprise one or more of the following, an absolute time (for example an absolute time stamp such as a GPS time stamp), current position co-ordinates (for example GPS co-ordinates), an absolute velocity of the transmitter at the time of transmitting, the absolute broadcast angle of the transmitter's radar signal, and/or an individual pattern to identify the transmitter over multiple pulses.

In some examples, the timestamp may indicate a time or flight of the signal by referring to a clock that is known to both transmitter and receiver (e.g. GPS time) and may be used to determine a distance which the signal has travelled. A transmission angle may indicate the path that the signal has travelled. The individual pattern may identify a specific transmitter and discriminate between radar signals received from different transmitters.

At step 204, the position determined at 202 from the received radar signal and the position associated with the embedded information determined at 203 are compared. The comparison determines whether the two positions correspond. It will be appreciated that in some embodiments, this comparison is to determine whether the two positions match. In other embodiments, the comparison may be made to determine whether the two positions are within a feasible range of each other. For example, this may take into account any inaccuracies of the determination at 202.

In the example where the indication of a position associated with the embedded data is explicit, for example comprises GPS co-ordinates, and the position of the sender of the radar signal is determined in GPS co-ordinates, a comparison of the co-ordinates can take place. It will however be appreciated, that because the determined position of the sender is an estimate the co-ordinates may not exactly match. In this case, the co-ordinates may be considered to match if they are within a range of each other. The range may be set by the accuracy of the estimate of the position of the sender of the radar signal.

In some embodiments, if it is determined that the positions correspond at 203, then the embedded information is considered to be authentic and can be trusted. In this case, the embedded information may be used further. If the positions do not correspond, then it may be determined that the embedded information is not authentic and cannot be trusted and the embedded information is discarded.

In other examples, the comparison may be used to determine a probability that embedded information from a specific sender is valid and/or authentic. For example, if the outcome of the comparison is a match a probability that embedded information from that sender is valid/authentic is increased and if the output is not a match a probability that embedded information from that sender is valid/authentic is decreased. A threshold may be set for the value of the probability below which embedded information from that sender is considered invalid and above which, the embedded information is considered valid. In this example, radar signals from a specific sender may be monitored over a period. This example may compensate for errors in the estimation of the sender position based on the reception characteristics of the received radar signal.

In general, embodiments may determine whether the position of a sender of a radar signal comprising embedded information corresponds to a position associated with the embedded information. In other words, embodiments may determine whether the received embedded information is sent from an entity that is in a position to be in possession of the information in the embedded signal.

In some further examples, radar signals from a sender may be monitored over a period to determine that for each received embedded information, the position associated with the embedded information corresponds to the position of the sender of the radar signal carrying the embedded information. Monitoring the position and velocity of the sender over a period may be of use to identify a malicious roadside entity even if the malicious road side entity is temporarily be in a valid position (for example in a position ahead of the vehicle 101) The monitoring may, in other examples, take into account a margin of error in the determination of the senders position.

Figure 3:
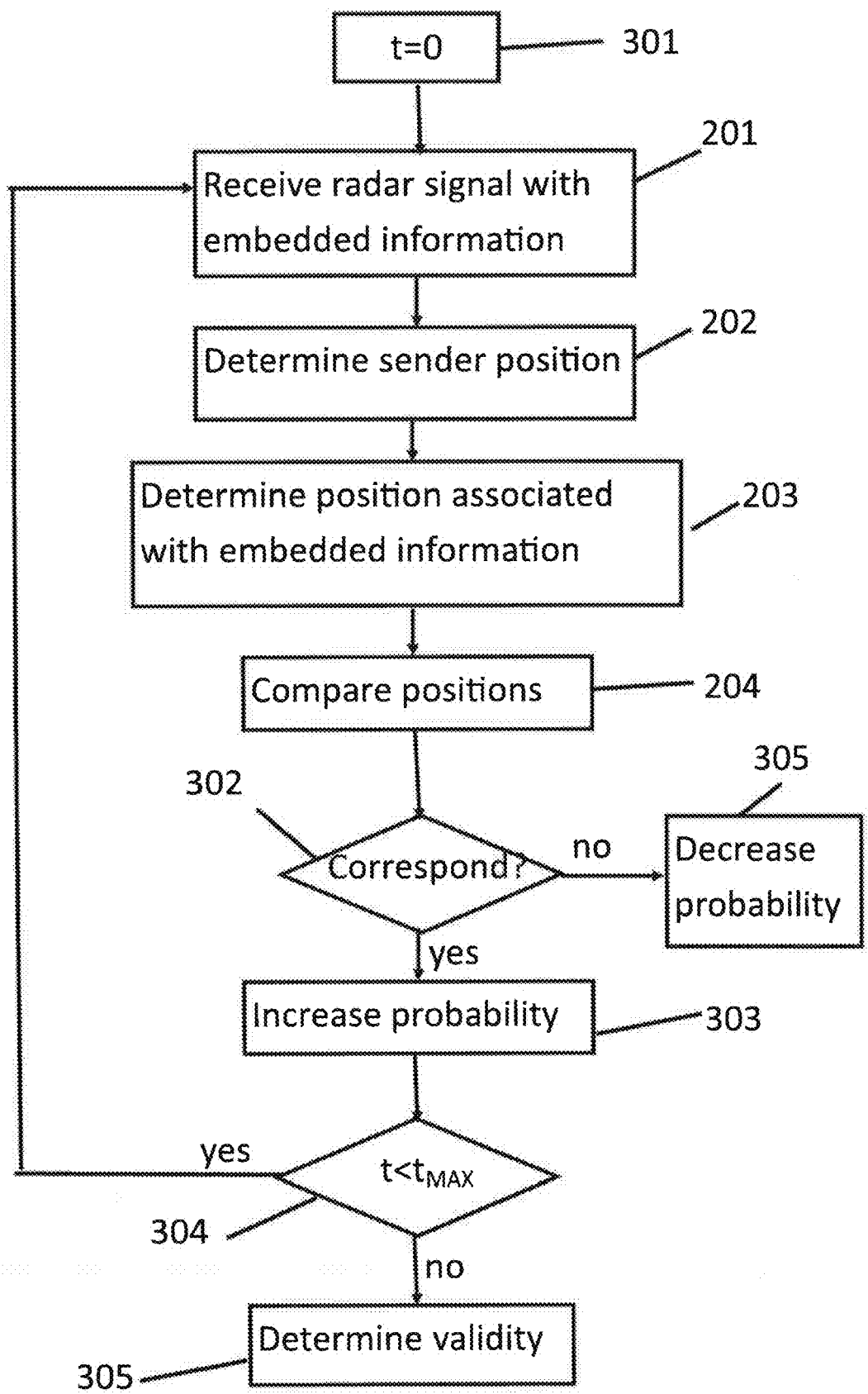
FIG. 3 is a flow diagram showing method steps according to a further embodiment.

FIG. 3 shows an example where radar signals comprising embedded information received from a first sender are monitored for a period. A probability that the first sender can be trusted may be set to an initial value. For each received embedded information from the first sender, a position associated with the embedded information is compared to a determined position of the first sender. For each comparison that results in no match, the probability may be reduced. For each comparison that results in a match, the probability may be increased. At the end of the period, the validity of the embedded information received from the first sender can be determined based on the end value of the probability. For example, if the probability is above a threshold, it can be determined that embedded information from the first sender can be trusted.

At step 301, a period for which the radar signals from the first sender will be monitored is begun. For example, a timer and/or counter may started and the value of the period t is equal to zero. At step 201, a radar signal with embedded information is received at the receiver from a first sender. A value indicating a probability that embedded information from the first sender may be trusted may be set to an initial value. The initial value of the probability may for example be a default value or may be weighted by factors such as a type of sender, a type of environment and/or other factors.

At step 202, a position of the first sender is determined in dependence on the reception characteristics of the received radar signal. At step 203, a position associated with the embedded information within the radar signal is determined. At step 204, the position determined at step 202 and the position determined at step 203 are compared. It will be appreciated that the steps 201 to 204 may correspond to the like referenced steps in the method of FIG. 2.

After the positions have been compared at step 204, a determination is made at step 302 whether the positions correspond. In some embodiments, the positions determined at step 202 may be in the same format (for example as co-ordinates) as the position determined at step 203 and the correspondence may be determined if the two positions are alike or within a range of each other. In other embodiments, the positions may define a position characteristic, for example a direction, orientation and/or distance from the receiver 101 and the correspondence may be determined by a match in a position characteristic.

If it is determined that the positions do not correspond, then the method proceeds to step 305 where a probability that the sender can be trusted is reduced. The method then proceeds to step 304.

If it is determined that the two positions correspond at step 302, the method proceeds to step 303. At step 303 a probability that the first sender may be trusted is increased. The method then proceeds to step 304. At step 304, it is determined whether the period for which monitoring of the radar signal is to take place has expired. For example it is determined whether the period (t) is less than a maximum period ($t_{MAX}$). If the period is less than the maximum time period ($t<t_{MAX}$), then the method proceeds back to step 201 where another radar transmission is received from the first sender comprising further embedded information.

The method thus repeats, checking each received radar transmission from that sender, for the predetermined period $t_{MAX}$. If it is found at step 302 that the positions do not correspond the probability is decreased and if it is found that the positions correspond, the probability is increased.

If it is determined at step 304 that the period has expired ($t \geq t_{MAX}$) then the method proceeds to step 305 where it is determined whether the first sender and/or embedded information received from the first sender can be trusted.

In this example it is determined whether embedded information received from the first sender is valid and/or authentic. A determination may be made that the sender can be trusted based on the value of the probability. For example, if the value of the probability is above a predetermined level, it may be determined that the sender can be trusted. In some embodiments, the value of the probability may be used to trigger different actions depending on the trustworthiness of the sender. For example, critical information from a source with low trustworthiness (low probability) may sound an alarm, while the same information from a source of high trustworthiness (high probability) may trigger an automated braking action.

For example, a high level of probability may correspond to a determination of valid embedded information may cause the embedded information to be used and/or cause the first sender to be marked as trusted. For example, the embedded information may be passed to other parts of a pre-collision system and may result in actions such as, for example, a collision alarm being sounded, automatic braking, pre-tensioning seatbelts and the such. A low level of probability may indicate invalid embedded information and may cause the received embedded information to be discarded and/or the first sender to be marked as untrustworthy. It will be appreciated that other actions may be triggered on the basis of other values of probability and for example in dependence on the type of embedded information.

In the example of FIG. 3, the period may be determined by any suitable means. In a first example, the period may be a period of time measured by a timer. The maximum period of time ($t_{MAX}$) may, for example, be based on the frequency of radar signals being received. In another example the period may be defined by a number of radar signals being received from the first sender. For example, the period may be the period taken to receive three of four radar signals comprising embedded information from the first sender. It will be appreciated that this number is by way of example only and the number may be based on for example, an accuracy of the estimation of the position of the first sender, robustness of the radar/receiver system, and/or how safety critical the application to which the embedded information related is. In this case, the period may be determined by a counter that is increased or decreased in response to the reception of a radar signal from the first sender.

It will also be appreciated a threshold value of the probability that a sender can be trusted is used to determine whether embedded information from the sender is valid and/or authentic. This threshold may be determined based on, for example, an accuracy of the estimation of the position of the first sender, robustness of the radar/receiver system, and/or how safety critical the application to which the embedded information related is.

In some examples, further checks as to the validity or authenticity of the received information may be carried out. In a first example, described in relation to FIG. 4, the embedded information may be further checked against information from other sources. In a second example, described in relation to FIG. 5, a feasibility of a motion or movement associated with the radar sender and/or embedded information may be used to check the authentication.

It will be appreciated that a vehicle 101 (or receiver system) may receive radar signals comprising embedded information from a first sender. In some cases, the vehicle 101 may be in the possession of information corresponding to the embedded information but received from sources other than a first sender. This corresponding information may have been received in radar signals from other senders and/or be information determined by sensor systems of the vehicle 101. In this case, embedded information received from the first sender may be compared to information corresponding to the embedded information from a different source.

Figure 4:
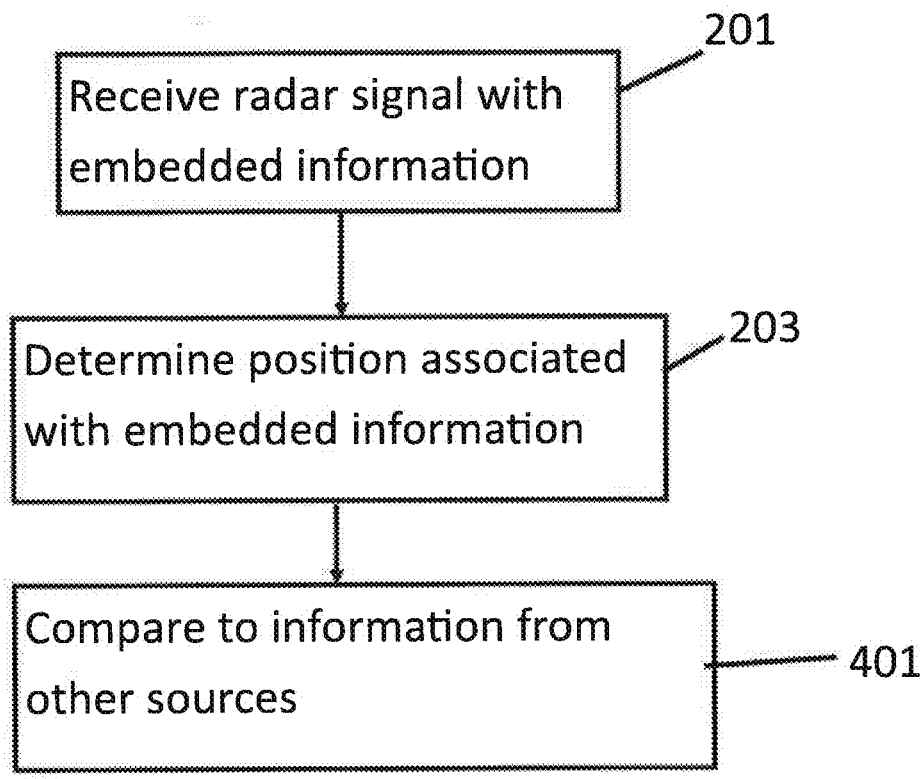
FIG. 4 is a flow diagram showing the method steps according to a further embodiment.

FIG. 4 shows an example where the embedded information, received in a first radar signal, is compared with information corresponding to the embedded information but received from other sources.

At step 201 of FIG. 4, a vehicle 101 receives a radar signal from a first sender. The radar signal may comprise embedded information. The embedded information may include an indication of a position associated with the embedded information.

At step 203 of FIG. 4, the vehicle 101 may determine a position associated with the embedded information. This determination may be based on the indication of position received in the embedded information. It will be appreciated that steps 201 and 202 of FIG. 4 may be similar to the like numbered steps of FIG. 2.

At step 401, the position associated with the embedded information is compared to information associated with that position from other sources. For example the vehicle 101 may receive information from radar signals from other senders and/or information from other systems, such as sensor systems, of the vehicle. This information may be associated with a position. For example, a sensor system may relay information about the road ahead and this information is associated with a position ahead of the vehicle 101. Alternatively information from radar signals from other senders may be associated with a position. The vehicle may determine whether the position associated with the embedded information from the first sender corresponds to a position associated with information from another source. If such a correspondence exists, the information from the other source and the embedded information may be compared to determine whether the information is consistent.

In one example, the vehicle 101 may receive a radar signal comprising first embedded information from a first sender. The vehicle may determine a first position associate with the first embedded information. The vehicle 101 may further receive a radar signal comprising second embedded information from a second sender and may determine a second position associated with the second embedded information. If the first and second positions correspond, then the first and second embedded information may be compared. If the first and second embedded information do not correspond, for example if they contain contrary or opposite information, then it may be determined that the embedded information is not valid/authentic. In some cases, information from one sender may be more trusted than information from another sender, and the least trusted information may be discarded. In other examples, both embedded information is discarded.

It will be appreciated that the first and second positions may not exactly correspond as the first and second sender cannot occupy exactly the same space. A correspondence of position may for example be determined if at least one characteristic, for example a direction and/or distance, of the first and second positions correspond. For example, it may be determined whether the first and second positions are within a range of each other. The range may be determined by the type of information and a range wherein it is feasible for both senders to be in possession of the same or similar information.

It will be appreciated that in some examples, the steps of the example of FIG. 4 may be carried out for a period similarly to the steps of FIG. 3. For examples, the result of the comparison at step 404 may cause a probability that the sender may be trusted to be increased and/or decreased. A determination of whether the sender may be trusted may be made based on the probability at the end of the period.

A first example of a further check that may be carried out was described in relation to FIG. 4. A second example of a further check that may be carried out is described in relation to FIG. 5. In the second example, a feasibility of a motion or movement associated with the radar sender and/or embedded information may be used to check the authentication.

Figure 5:
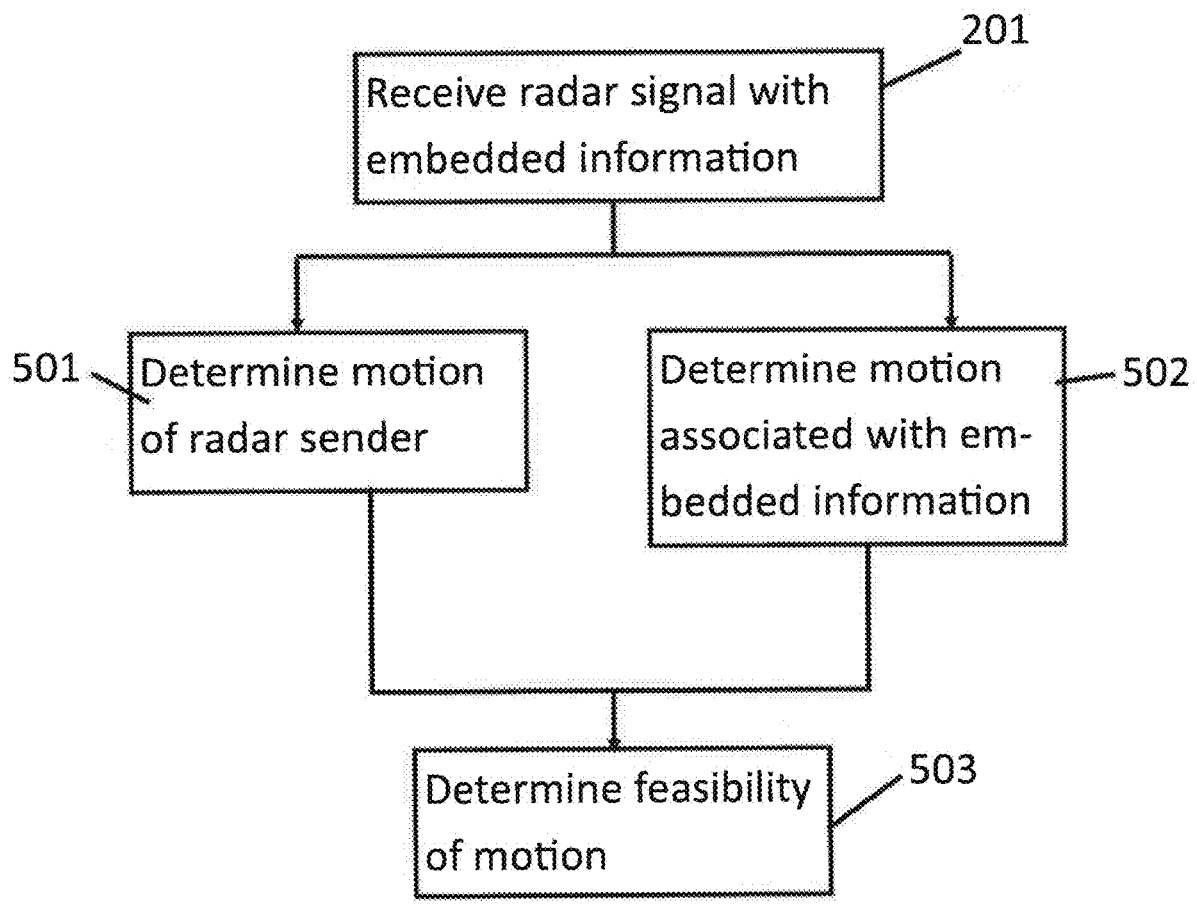
FIG. 5 is a flow diagram showing the method steps according to a further embodiment.

In the examples, at least one of the motion associated with the embedded information and the motion associated with the sender of the radar signal may be used to carry out the check. In the example of FIG. 5 both are used. It will be appreciated that this check is appropriate in examples where a plurality of signals comprising embedded information are received from a sender over time.

At step 201 radar signals comprising embedded information are received. At step 501 a motion of the sender of the radar signals is determined. At step 502 a motion associated with the embedded information is determined. In some examples, the motion may be determined by comparing at least a first and second position. For example at step 501 at least a first and second determined position of the sender of the radar signal is used. At step 502, at least a first and second determined position associated with the embedded information is used. It will be appreciated that in some examples, the steps of FIG. 5 may be carried in conjunction with the steps associated with any previous embodiment.

At step 503 a feasibility of the motion is determined. The feasibility of the motion may be determined by one or more of: determining a physical feasibility of the motion of the radar sender; determining a physical feasibility of the motion associated with the embedded information; and determining whether the motion of the radar sender and the motion associated with the embedded information correspond. It will be appreciated that in some cases only the motion of the radar sender is used for the determination, in some cases only the motion associated with the embedded information is used and in some cases both motions are used. It will be appreciated that one or both of the steps 501 and 502 may be carried out in some examples.

The motion may correspond to for example one or more of a change in position, a velocity, direction and/or orientation associated with the radar sender and/or embedded information.

Figure 6:
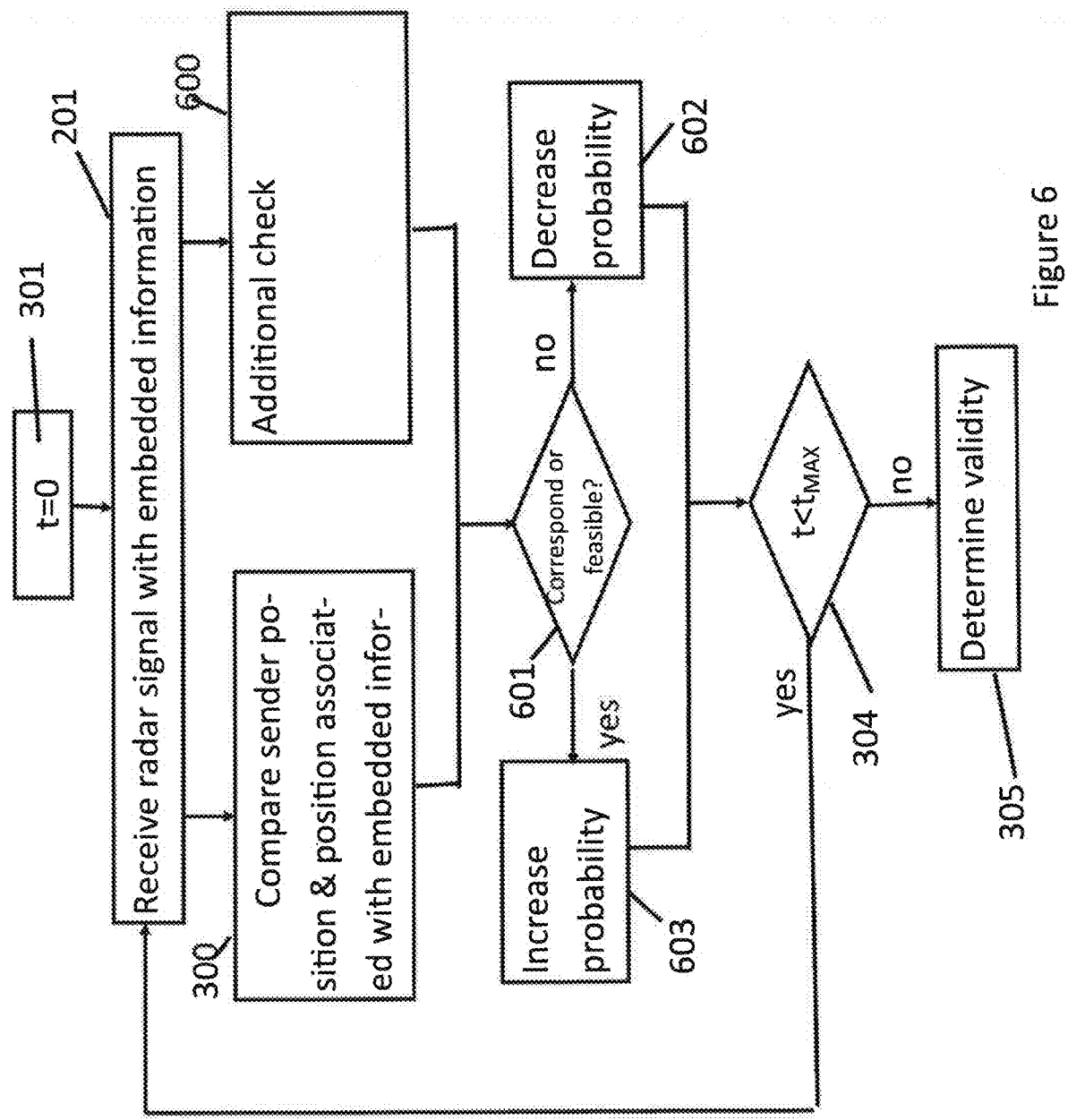
FIG. 6 is a flow diagram showing the method steps according to a further embodiment.

FIG. 6 shows an example of the method of FIG. 3 carried out with an additional check such as that described in relation to FIGS. 4 and 5.

FIG. 6 shows an example of carrying out an additional check on the authenticity/validity of embedded information within a radar signal. In the example of FIG. 6, the radar signal is monitored over a period, however, it will be appreciated that this is by way of example only and in some examples no period is initiated.

At step 301 in FIG. 6, a period for which radar signals from a first sender are to be monitored is started. At step 201, a radar signal comprising embedded information is received from the first sender. The method then proceeds to steps 300 and 600.

At step 300 a determined position of the first sender is compared to a position associated with the embedded information in the radar signal. It will be appreciated that in some examples, step 300 may be similar to steps 202 and 203 of FIG. 3. The method then proceeds to step 601 where it is determined whether the positions compared at step 300 correspond. If they do correspond, the method proceeds to step 603 where a probability that the first sender can be trusted is increased. If they do not correspond, the method proceeds to step 602 where the probability is decreased. The method proceeds to step 304 from both steps 603 and 602.

At step 600, an additional check is carried. This check may for example comprise comparing embedded information in the received radar signal to corresponding information from another source. Alternatively or additionally, step 600 may comprise determining whether a motion corresponding to the first sender and/or associated with the embedded information is feasible. The method proceeds from step 600 to step 601 where it is determined whether the probability should be increased or decreased.

For example, if step 600 compared the embedded information to further information it is determined if the information corresponds at step 601. If it does, the method proceeds to step 603. If it does not, the method proceeds to step 602. If, at step 600, a motion of the first sender and/or embedded information is determined, then it is determined whether the motion is feasible at step 601. If the motion is feasible, the method proceeds to step 603, if it is not feasible, the method proceeds to step 602. It will be appreciated that this is by way of example only and in other examples, a determination of lack of correspondence or feasibility from step 600 may cause the method to exit and it be determined that the embedded information/first sender is not authentic/valid.

At step 304, it is determined where the period is complete. If the period is not complete, the method returns to step 201 where another radar signal may be received. If the period is complete, the method may proceed to step 305. At step 305, it may be determined whether the first sender is trusted in dependence on the value of the probability.

Figure 7:
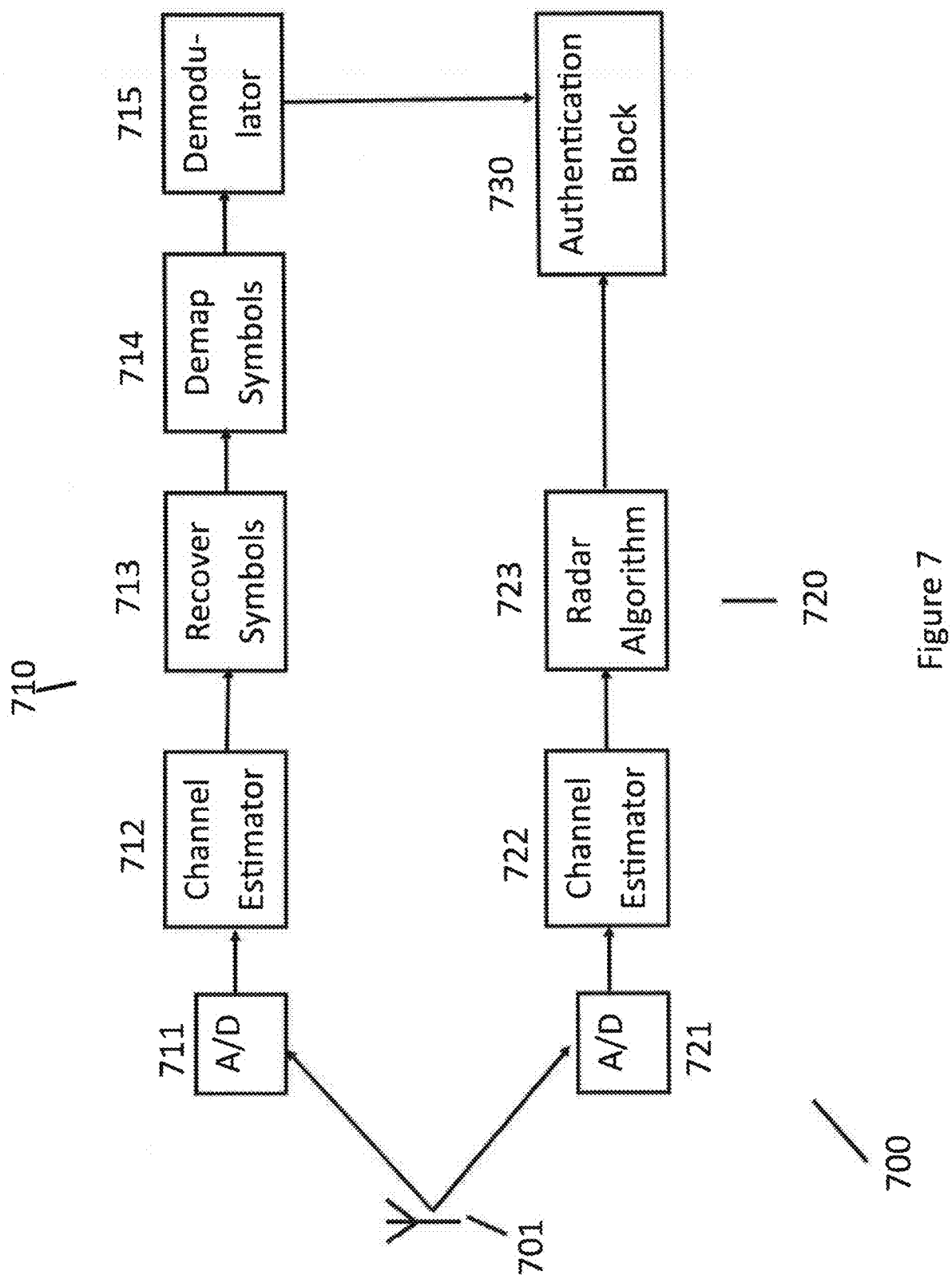
FIG. 7 is a schematic diagram showing a transceiver in accordance with an embodiment.

FIG. 7 shows an example of a receiver that may be used in embodiments of the present application. The receiver may form part of a joint radar-communication system and may be configured to provide information to further entities in a vehicle, for example to further entities of a pre-collision system.

FIG. 7 is a block diagram of an example of a receiver that may be used in embodiments of the present application. The receiver comprises an antennae 701, a first path 710 for the demodulation of the embedded information and a second path 720 for the processing of the radar signal. It will be appreciated that the receiver 700 of FIG. 7 may comprise more or fewer components and may carry out additional steps relating to the reception of a joint radar-communication system.

The first path 710 comprises a first analogue to digital converter (A/D) 711 with a first sampling rate which is configured to receive a radar signal from the antenna 701. The output of the A/D 711 is provided to a channel estimator 712. The output of the channel estimator 712 is provided to a symbol recovery block 713 which is further coupled to a symbol de-mapping block 714. The output of the symbol de-mapping block 714 is input into a demodulator 715 which demodulates and provides the information embedded in the radar signal. The information that was embedded in the radar signal is provided to an authentication block 730.

The second path 720 comprises a second analogue to digital converter (A/D) 721 with a second sampling rate. In this example two A/D converters having two sampling rates are shown however it will be appreciated that this is by way of example only. In other examples the embedded information may be directly embedded into the radar signal. In this case it may be seen as, for example, phase jump on certain sub-carriers of the radar signal at certain times. In some examples, the first and second paths 710 and 720 may share an A/D converter and/or a channel estimator.

The output of the A/D 721 is coupled to a channel estimator 721. The output of the channel estimator is coupled to a radar algorithm 723. An output of the radar algorithm provides a position of the sender of a radar signal, determined from the radar signal, to the authentication block 730. It will be appreciated that in some examples the channel estimator 722 may form part of the radar algorithm.

In operation, the antennae 701 may receive a radar signal from another vehicle or other source of communication. The radar signal may be a radar signal carrying embedded information. In this example the embedded information may correspond to a vehicle to vehicle (V2V) communication. In a particular example, the radar signal may comprise an OFDM signal consisting of a plurality of parallel orthogonal sub carriers where data symbols are mapped to some of the sub-carriers through PSK. The remaining sub-carrier may be reserved for radar, and/or act as pilot signals.

The received radar signal may be split between the two paths 710 and 720. The first path 710 may be configured to recover the information embedded in the radar signal, for example recover a V2V communication carried by the radar signal. The second path 720 may be configured to carry out a radar algorithm to map the surrounding environment of the receiver 700. It will be appreciated that the second and optionally the first paths may also be used for the reception of radar signals that were originally transmitted from the vehicle in which the receiver 700 is implemented. In other words, the receiver 700 may be closely paired with a radar transmitter as in conventional radar applications.

On the second path 720, the radar signal is converted to a digital signal by the second A/D 721. The sampling rate of the second A/D 721 may be in accordance with radar operation and thus may be different to the sampling rate of the first A/D 721. The digital radar signal is then provided to the channel estimation block 721 where channel estimation is carried out. The resultant data is provided to the radar algorithm 723. The radar algorithm 723 may use the radar signal information and the information about the channel on which the radar signal was received to map the radar signal back to a position of the sender of the radar signal.

It will be appreciated that the channel estimation and radar algorithm may be combined in some examples. For example the characteristics of the channel may be used in the radar algorithm to map the surrounding environment. For example, the characteristics of the channel, may be indicative of reflecting objects on the channel, and thus the channel estimator is delivering input for environment mapping. The Doppler shift of the channel characteristic may indicate the velocity of objects.

On the first path 710, the radar signal is provided from the antenna 701 to a first A/D converter 711. The first A/D 711 may have a sampling rate that corresponds to the sampling rate required for the demodulation of the embedded information. In some examples the sample rate of the first A/D converter 711 may be less than the sampling rate of the second A/D converter 721.

The converted radar signal is provided to a channel estimator 712. The channel estimator may provide the converted radar signal and channel estimation information to the symbol recovery block 713. In some examples the symbol recovery block may remove any preamble from the OFDM signal to recover the OFDM data symbol. The recovery block may additionally remove any extraneous data from the OFDM signal, for example any guard intervals for the symbol. The symbols may then be provided to the de-mapping block 714. The de-mapping block 714 may be configured to de-map the symbols from their carriers to provide data to be demodulated. For example, the de-map block may comprise a fast fourier transform (FFT) for de-mapping the symbols from the orthogonal sub-carriers of the OFDM signal.

The de-mapped symbols may then be provided to a demodulator that may demodulate the data to provide the information carried in the radar signal. In some examples this embedded information may be in the format of a V2V or V2X message. The demodulated information may be provided to the authentication block 730.

The authentication block 730 may receive the position of the sender determined in dependence on the radar signal and receive the information that was embedded in the radar signal. The authentication block may then be configured to carry out the method steps in accordance with any of the methods 2 to 6. For example, the authentication block may determine a position of the sender in dependence on the radar signal by receiving the position from the second path 720. The authentication block 730 may further determine the position of a sender associated with the embedded information in dependence on the embedded information received from the demodulator 715. The authentication block 730 may further carry out a comparison of these positions and determine whether or not the sender can be trusted. It will be appreciated that the authentication block 730 may be configured to carry out any of the method steps in accordance with embodiments.

Figure 8:
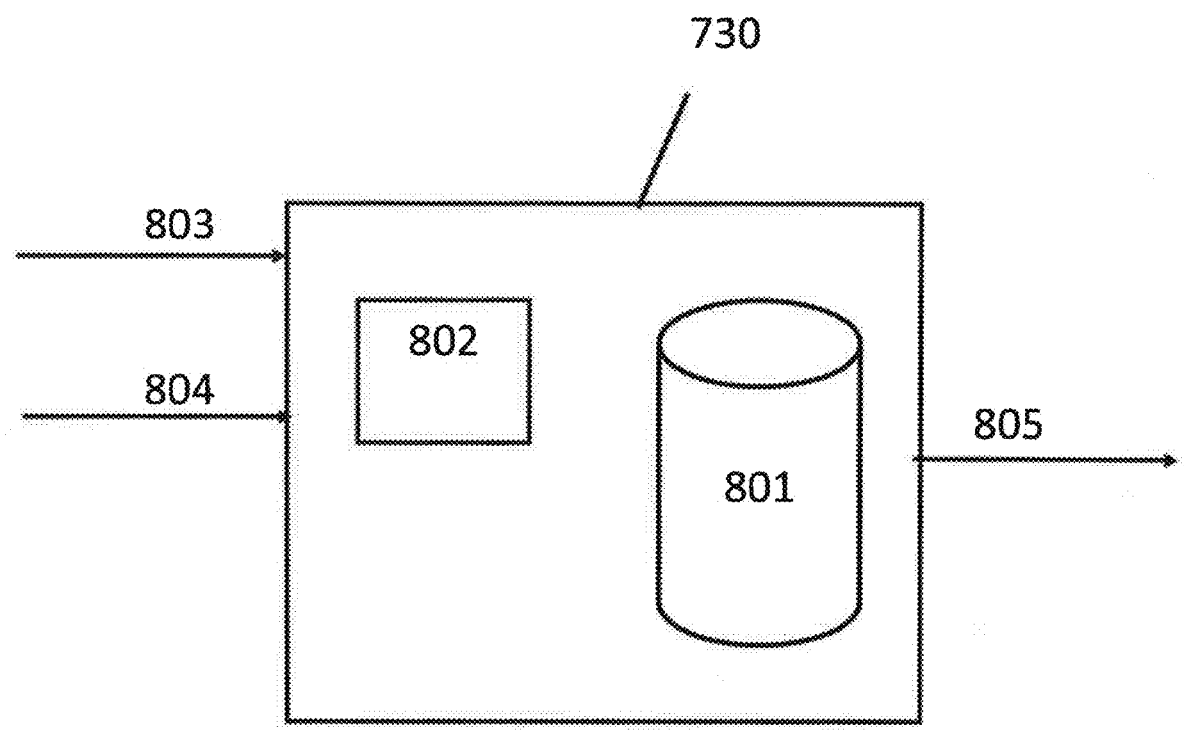
FIG. 8 is a schematic diagram showing an apparatus in accordance with an embodiment.

FIG. 8 shows an example of the authentication block 730 comprising at least one memory 801 and a processor 802. The authentication block may have a first input for receiving a position of a sender of a radar signal determined in dependence on the radar signal. The authentication block 730 may comprise a second input for receiving information corresponding to information embedded in the radar signal and transmitted to the receiver in the radar signal. The processor 802 and at least one memory 801 may be configured to carry out any of the method steps of FIGS. 2 to 6 to determine whether a sender of the radar signal and/or the embedded information can be trusted. The authentication block 730 may provide an output 805 providing an indication as to whether the radar sender and/or embedded information is authenticated.

The output may be provided to other entities in a pre-collision system which may or may not use the embedded information to carry out actions.

It will be appreciated that the memory 801 and processor 802 of the authentication block 730 may not be exclusive for use in the authentication block and may be used in conjunction with other algorithms being implemented in a system, for example a pre-collision system.

In the foregoing, a radar signal comprising embedded data has been described as being received from a first sender. The embedded data may comprise V2X-type communications. In some implementations of embedded radar communication, the data rate and/or bandwidth of the radar signal for carrying embedded data may be limited. In some cases, a sender may wish to send data over a non-radar channel such as a V2X channel in order to have a higher bandwidth and/or data rate.

In a further example of the present disclosure, a radar signal comprising embedded data from a first sender may be used to verify or authenticate data transmitted from the first sender over a non-radar channel. For example, in some examples, the first sender may transmit a radar signal comprising embedded data and then, on a further non-radar channel, transmit further V2X data.

In these examples, the nature of the embedded data within the radar signal may be used to authenticate or validate data received from the first sender, regardless of whether it has been received as embedded data in a radar signal or on a V2X channel.

In these further examples, a radar signal may be received with first identity information. A non-radar signal may be received with second identity information. If the first and second identity information correspond, then the radar and non-radar signal are verified as coming from a first sender. The first and second identity information may be used to authenticate that the radar message and non-radar message are received from a first sender. In examples, the first position may be verified in dependence on the receive characteristics of the radar signals. The non-radar signal may be considered to be associated with that first position in dependence on the second identity in the non-radar signal corresponding to the first identity in the radar signal.

Figure 9:
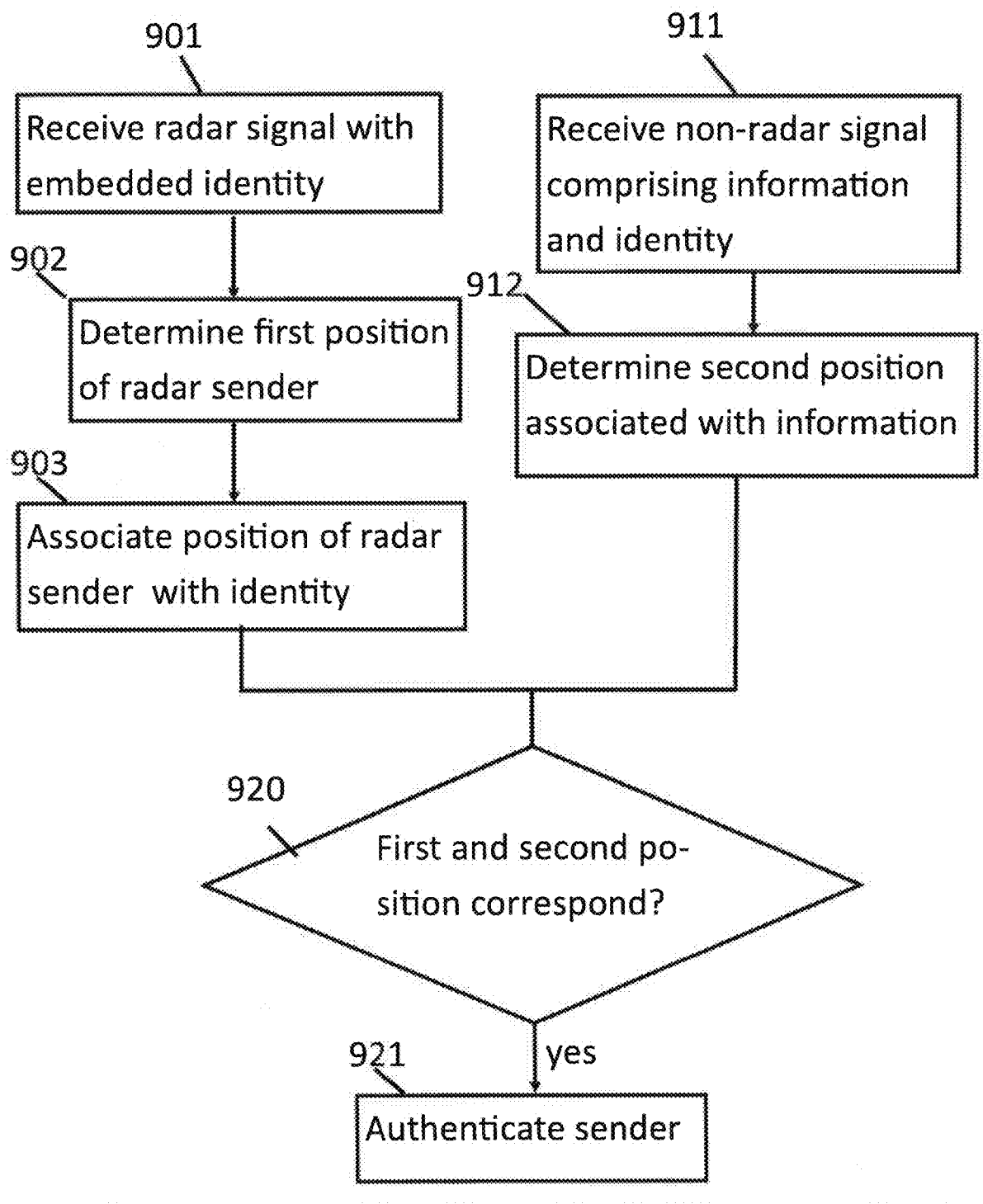
FIG. 9 is a flow diagram showing the method steps according to a further embodiment.

FIG. 9 shows an example of a method that may be carried out by the vehicle or entity 101 in order to authenticate communication on a non-radar channel using information embedded in a radar communication.

At step 901, the entity 101 may receive a radar signal from a first sender. First identity information may be embedded within the radar signal. At step 902, the entity 101 may determine a first position from which the radar signal was sent (for example, the position of the first sender) based on the radar signal. It will be appreciated that this first position may be determined on the basis of the reception characteristics of the radar signal as has been discussed with reference to the examples of FIGS. 1 to 8. The entity may associate the first identity information embedded in the radar signal with the determined first position.

At step 911, the entity 101 may receive information on a non-radar channel. In specific examples, the non-radar channel may be a V2X channel. The information may comprise second identity information and further V2X data or information. If the second identity information corresponds to the first identity information, then it can be considered that the position from which the information on the non-radar channel was sent corresponds to the position from which the radar signal was sent. In other words, the radar signal and non-radar signal have been sent from the same position.

By including the second identity information in the information on the non-radar channel, the first sender may identify itself to the entity 101 as being the same sender that sent the radar signal at step 901.

It will be appreciated that the first and second identity information may directly correspond, for example they are the same identity in some examples. In other examples, the first and second identity information may correspond in that they relate to a shared identity, for example a shared secret. The first and second identity information may correspond in that they both identify knowledge of an identity of the first sender.

At step 902, the entity 101 may process the information received over the non-radar channel and determine a position (second position) associated with that information. This may for example be carried out similarly to the determination of a position associated with the embedded information in the above embodiments.

At step 920, the position associated with the corresponding first and second identity information (first position) and the position of the first sender according to the information on the non-radar channel (second position) may be compared. It will be appreciated that the first identity information included in the radar signal and the second identity information in the non-radar signal is used to identify that both signals are sent from a first sender at a first position. Thus, it can be assumed that the first and second positions should correspond as they both relate to the first sender.

If the information in the non-radar signal is erroneous, for example is sent maliciously, then the second position will be different to the first position. At step 920, if the first and second positions correspond, the method proceeds to step 921 where, in some examples, the sender or information is authenticated. It will however be appreciated that this is by way of example only. In other examples, the correspondence or non-correspondence of the positions may cause a probability that the sender may be trusted to increase and decrease respectively similarly as described in reference to the above embodiments. In other examples, instead of step 921, an action may be taken based on the value of the probability. It will also be appreciated that if the positions do not correspond, action may be taken as discussed in accordance with the examples of FIGS. 1 to 8. It will be appreciated that the determination of whether the first and second positions correspond may be similar to the comparison of step 204 of FIG. 2.

In FIG. 9, the steps 901 to 903 and 911 to 912 are shown as being carried out simultaneously. It will be appreciated that this is by way of example only and the steps 901 to 903 may be carried out before 911 to 912 or visa versa in dependence on the specific implementation of the identity information. In some examples, the radar signal may be received only after the non-radar signal to prevent malicious entities from interception and copying the second identity information. It will be appreciated that the first sender may send both a radar signal and a non-radar signal comprising identity information.

In further examples, the method of FIG. 9 may be used to authenticate the first sender. In these examples, the result of the comparison or determination at step 920 may be used to increase or decrease a probability that the sender may be trusted. Once the probability has reached a threshold level, all communications (radar and non-radar channel) having identity information associated with the first sender may be trusted. It will be appreciated that the level of the threshold may be selected to be in line with the parameters of the system, for example the probability of error of the comparison 920.

The first sender includes the first and second identity information in the radar signal and the non-radar signal respectively. It will be appreciated that this identity information may, in some examples, be unique to the first sender and/or unique to a message or set of messages sent using the identity information. In the first example the identity information may correspond to a private key of the first sender. The first sender may sign the embedded data in the radar signal with the private key and may sign the information in the non-radar signal with the private key. In another example, the identity information may comprise a token (such as a random number), hash or other encryption that may uniquely identify the first sender.

It will be appreciated that the first and second identity information may be implemented in numerous manners. Some examples are described below, however it will be appreciated that other manners or modifications to the below manners may be carried out.

In a first example, the first and second identity may comprise a token. At a first time, a message on a non-radar channel may be sent from a transmitter, for example from a first sender. As described, the message may include second identity information, in this case corresponding to a token. After a time (for example a short, defined time frame after the non-radar message was transmitted) a radar signal may be sent comprising first identity information be embedded in the radar signal. The first identity information may comprise the token. Thus, at the receiver, the second identity information in the non-radar signal may correspond to first identity information in the radar signal thus authenticating that the radar and non-radar signal are received from a first sender. In this example, the non-radar information, or at least the second identity information part (for example, the token) is be transmitted before the radar signal comprising the first identity information is transmitted. This is because an attacker may receive the same radar signal, and use the received token to falsely authenticate her own message. A token may for example be used for a specified number of messages, for example only one or very few messages on the non-radar link, and only one message on the radar link, so that the same token cannot be used for a replay attack. In this case there may be a time offset between receiving non-radar information and authenticating the position from which the non-radar information was received.

In a second example implementation, the first identity information in the radar signal may comprise a key for symmetrical encryption. The message or information in the non-radar communication may be encrypted with this key. Thus, if the key in the radar message can decrypt encrypted information in the non-radar signal, the radar and non-radar signals can be considered to originate from a first position.

In a third example implementation the first identity information in the radar signal may comprise a key for asymmetrical encryption, for example a public key of the sender. The message or information in the non-radar communication may be encrypted with a private key paired to the sent public key. Thus, if the public key in the radar message can decrypt private key encrypted information in the non-radar signal, the radar and non-radar signals can be considered to originate from a first position. In this examples, all the non-radar messages may be encrypted with the private key and this key is never transmitted.

With the use of keys, the communication partners may agree on a symmetrical key via the non-radar communication channel, e.g. via Diffie-Hellman, public key encryption or other. The sender may broadcast a token (first identity information) over radar embedded communication, and include the same token (second identity information) in the encrypted non-radar communication. The (first identity information) token in the radar communication may be encrypted or unencrypted; however an unencrypted token may be received by several receivers at the same time, while each of the receivers may use a different key for the non-radar communication with the sender.

The sender may include the same token (second identity information) in an encrypted non-radar communication, and thus may authenticate the messages. As the encryption key is only known to sender and transmitter, an attacker cannot produce messages with the right token. Therefore the token can be shared before non-radar message is sent, and can be reused over a long period of time. In a variation the non-radar communication may be encrypted with private key of the receiver In a fourth example implementation, a message may be transmitted over the non-radar communication channel. In this example the second identity information may be considered to be the message itself or part thereof. Within a defined time window of the moment when the actual message was transmitted, a hash of the message may be embedded in the radar signal. The hash may be considered to the first identity information. If the hash of the message corresponds to the message, it can be authenticated that the radar message and the non-radar message are from the same sender.

In further examples, the message may be salted (random number/content added to it), to avoid replay attacks. In this case, the radar and non-radar messages may be sent simultaneously or in any order however in this case, each message may need to be authenticated separately The example of FIG. 9 may be implemented by the authentication block 730 of FIG. 8. In this example the first input 803 is for receiving a position of the first sender determined in dependence on the radar signal however the second input 804 may be configured to receive the information sent on the non-radar channel. The processor 802 and at least one memory 801 may be configured to carry out any of the method steps of FIG. 9 to determine whether a sender of the radar signal and the non-radar channel information can be trusted. The authentication block 730 may provide an output 805 providing an indication as to whether the radar sender and/or information on the non-radar channel is authenticated.

It will also be appreciated that the radar processing in conjunction with the example of FIG. 9 may be carried out in accordance with the second processing path 720 of the receiver 700 of FIG. 7. It will be appreciated that a further processing path will be provided to process signals received on the non-radar channel.

In the foregoing the vehicle 101 has been described as carrying out the described methods. It will however be appreciated that the method may be carried out by any suitable entity for example a system such as a joint radar and communication system or receiver that may be implemented within or separately to a vehicle 101.

In the foregoing we have referred to the receiver forming part of a vehicle. It will be appreciated that a vehicle may be any mobile entity such as a car, transport truck, train, motorcycle and/or other transport entity. Furthermore, it will be appreciated that embodiments are not restricted to the use of vehicles only and may apply to any entity receiving a radar signal comprising embedded information. It will also be appreciated that in some examples, the receiver may form part of a V2X infrastructure, for example a traffic light or central hub.

The invention claimed is:

1. An apparatus comprising:
   an input configured to receive, for each of a plurality of time slots, a plurality of radar signals comprising a first embedded information encrypted with a public key of a sender of the radar signals, and a second embedded information of a non-radar signal encrypted with a private key signed by the sender, wherein the first embedded information modulates at least one of the radar signals;
   a first path configured to recover, for each of the plurality of time slots, the first embedded information from the at least one of the radar signals;
   a second path configured to determine, for each of the plurality of time slots, a position of the sender of the radar signals based on a radar algorithm; and
   an authentication block configured to, for each of the plurality of time slots:
      determine a first position information corresponding to the position of the sender and a second position information associated with the first embedded information,
      determine a third position information from the second embedded information, compare the first position information to the second position information and the third position information, and increase a probability value when the first position information matches the second position information and the third position information, and decrease the probability value when the first position information does not match one of the second position information and the third position information, wherein a probability that the sender is authentic is determined in response to the probability value exceeding a threshold value after all of the time slots have elapsed.

2. The apparatus of claim 1, wherein the apparatus is a joint radar and communication system.

3. The apparatus of claim 1, further comprising receiving one of a vehicle to vehicle communication, a vehicle to infrastructure communication and a vehicle to everything communication in response to the sender being determined to be authentic.

4. The apparatus of claim 1, further comprising triggering a braking action in response to the sender being determined to be authentic and, wherein the threshold value equals a high threshold value.

5. The apparatus of claim 1, further comprising sounding an alarm in response to the sender being determined to be authentic and, wherein the threshold value is greater than a low threshold value and less than a high threshold value.

6. The apparatus of claim 1, wherein a plurality of the first position information determines a first motion of the sender and a plurality of the second position information determines a second motion associated with the first embedded information, wherein each of the plurality of the first position information is determined from a respective one of the radar signals, and each of the plurality of the second position information is determined from the first embedded information of the respective one of the radar signals.

7. The apparatus of claim 6, wherein determining the first motion of the sender comprises determining a difference between two of the plurality of the first position information.

8. The apparatus of claim 7, wherein the authentication block is further configured to determine the first motion of the sender in dependence on the difference.

9. The apparatus of claim 6, wherein the authentication block is further configured to compare the first motion to the second motion, wherein the sender is determined to be authentic when the first motion matches the second motion.

10. The apparatus of claim 6, wherein determining the second motion of the sender comprises determining a difference between two of the plurality of the second position information.

11. The apparatus of claim 10, wherein the authentication block is further configured to determine a second motion associated with the embedded information in dependence on the difference.

12. A method comprising authenticating information embedded within radar signals comprising:

receiving at an antenna of a receiver, for each of a plurality of time slots, a plurality of radar signals comprising a first embedded information encrypted with a public key of a sender of the radar signals, and a second embedded information of a non-radar signal encrypted with a private key signed by the sender, wherein the first embedded information modulates at least one of the radar signals;

determining from the radar signals, for each of the plurality of time slots, with an authentication block of the receiver, a first position information corresponding to a position of the sender;

determining from the first embedded information, for each of the plurality of time slots, with the authentication block of the receiver, a second position information;

determining a third position information from the second embedded information;

comparing, for each of the plurality of time slots, the first position information to the second position information and the third position information, with the authentication block of the receiver;

increasing a probability value when the first position information matches the second position information and the third position information; and decreasing the probability value when the first position information does not match one of the second position information and the third position information, wherein a probability that the sender is authentic is determined in response to the probability value exceeding a threshold value after all of the time slots have elapsed.

* * * * *